(12) United States Patent
Zajac et al.

(10) Patent No.: US 11,047,728 B2
(45) Date of Patent: Jun. 29, 2021

(54) AIRCRAFT PASSENGER LUGGAGE BIN LOAD WEIGHT AND BALANCE SYSTEM

(71) Applicant: The Boeing Company, Chicago, IL (US)

(72) Inventors: Michal Zajac, Gdansk (PL); Pawel Kajak, Gdansk (PL)

(73) Assignee: THE BOEING COMPANY, Chicago, IL (US)

(*) Notice: Subject to any disclaimer, the term of this patent is extended or adjusted under 35 U.S.C. 154(b) by 395 days.

(21) Appl. No.: 15/864,036

(22) Filed: Jan. 8, 2018

(65) Prior Publication Data

US 2019/0212183 A1 Jul. 11, 2019

(51) Int. Cl.
| | |
|---|---|
| *G01G 19/08* | (2006.01) |
| *G01G 19/417* | (2006.01) |
| *B64D 11/00* | (2006.01) |
| *G01G 19/52* | (2006.01) |
| *G01G 19/58* | (2006.01) |
| *G01G 19/414* | (2006.01) |
| *G01G 19/62* | (2006.01) |

(52) U.S. Cl.
CPC ........... *G01G 19/08* (2013.01); *B64D 11/003* (2013.01); *G01G 19/414* (2013.01); *G01G 19/417* (2013.01); *G01G 19/52* (2013.01); *G01G 19/58* (2013.01); *G01G 19/62* (2013.01)

(58) Field of Classification Search
CPC ........ G01G 19/08; G01G 19/52; G01G 19/58; G01G 19/414; G01G 19/62; G01G 19/417; G01G 19/387; G01G 19/393; B64D 11/003; B64D 43/00; B64C 17/02
USPC .......................................................... 177/1
See application file for complete search history.

(56) References Cited

U.S. PATENT DOCUMENTS

| | | | |
|---|---|---|---|
| 5,441,218 A | 8/1995 | Mueller et al. | |
| 6,452,487 B1* | 9/2002 | Krupinski | B60R 21/013 180/290 |
| 7,723,935 B2 | 5/2010 | Kneller et al. | |

(Continued)

FOREIGN PATENT DOCUMENTS

| | | |
|---|---|---|
| EP | 2910472 A1 | 8/2015 |
| EP | 3173329 A1 | 5/2017 |

OTHER PUBLICATIONS

Extended European Search Report for Application No. 19150626.0 dated May 17, 2019, 7 pgs.

*Primary Examiner* — Marrit Eyassu
(74) *Attorney, Agent, or Firm* — Moore IP Law

(57) ABSTRACT

A load weight and balance system has first sensors for providing a first output signal proportional to an available internal volume of an associated passenger luggage storage bin. Second sensors provide a second output signal proportional a weight of any luggage in the associated passenger luggage storage bin. Display devices provide a visual indication whether or not each passenger luggage storage bin is filled to capacity. A main display provides a visual indication of the storage status of all of the passenger luggage storage bins. A processor receives the signals from the first sensors and the second sensors, calculates whether or not each of the passenger luggage storage bins is filled to capacity and whether or not each of the passenger luggage storage bins is within a predetermined weight value, and determines whether or not the weight distribution of the passenger luggage storage bins in the aircraft is balanced.

20 Claims, 6 Drawing Sheets

(56) References Cited

U.S. PATENT DOCUMENTS

| | | | |
|---|---|---|---|
| 8,494,663 B2 | 7/2013 | Lamoree et al. | |
| 2004/0226996 A1* | 11/2004 | Stefani | G01G 19/07 |
| | | | 235/384 |
| 2005/0060246 A1* | 3/2005 | Lastinger | G06Q 10/087 |
| | | | 705/28 |
| 2007/0050271 A1* | 3/2007 | Ufford | G06Q 10/087 |
| | | | 705/28 |
| 2007/0265890 A1 | 11/2007 | Curtis | |
| 2008/0055836 A1* | 3/2008 | Lamoree | B64D 11/003 |
| | | | 361/837 |
| 2008/0078870 A1 | 4/2008 | Kneller et al. | |
| 2008/0251640 A1 | 10/2008 | Johnson et al. | |
| 2009/0099775 A1* | 4/2009 | Mott | A01B 69/008 |
| | | | 701/300 |
| 2009/0138191 A1* | 5/2009 | Engelhard | G01G 23/3735 |
| | | | 701/124 |
| 2009/0189733 A1 | 7/2009 | Wieding et al. | |
| 2013/0290221 A1 | 10/2013 | Jindel | |
| 2014/0000969 A1* | 1/2014 | Carruthers | G06F 11/3013 |
| | | | 177/136 |
| 2014/0077952 A1 | 3/2014 | Boss et al. | |
| 2016/0109280 A1* | 4/2016 | Tiu | G01D 7/00 |
| | | | 702/173 |
| 2017/0152044 A1* | 6/2017 | Balasubramanian | |
| | | | B64D 11/003 |
| 2017/0283086 A1* | 10/2017 | Garing | B64D 45/0005 |
| 2018/0086464 A1* | 3/2018 | Riedel | G06K 17/00 |
| 2019/0005441 A1* | 1/2019 | Savian | G06Q 10/087 |
| 2019/0177012 A1* | 6/2019 | Feiner | G06Q 10/087 |
| 2019/0315471 A1* | 10/2019 | Moore | B64C 29/0016 |

\* cited by examiner

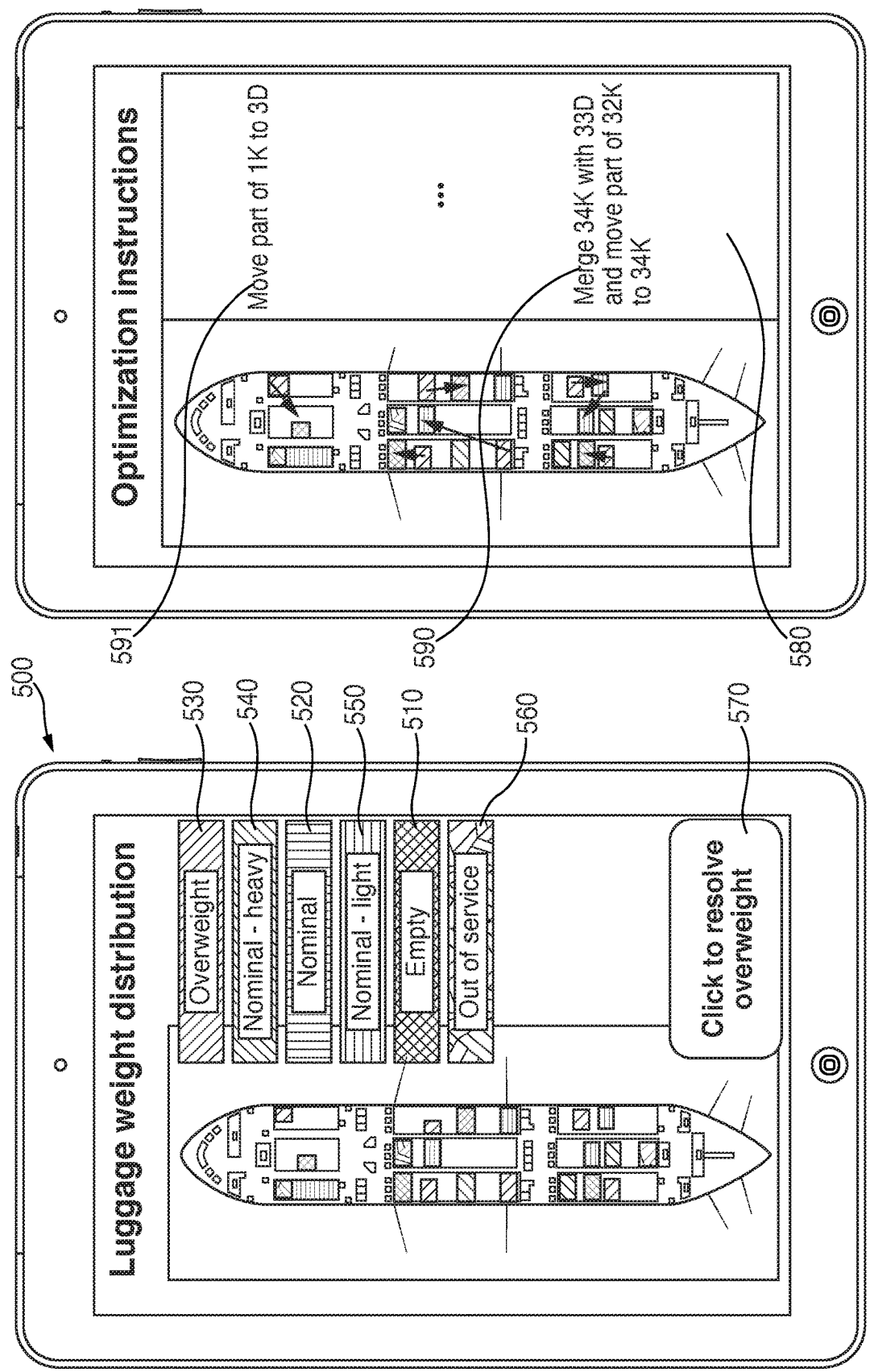

AIRCRAFT PASSENGER LUGGAGE BIN LOAD WEIGHT AND BALANCE SYSTEM

FIELD

This disclosure relates generally to an aircraft passenger luggage bin load weight and balance system for use in an aircraft.

BACKGROUND

Airplane turn time—the time required to unload an airplane after its arrival at the gate and to prepare it for departure again—has increased since the mid-1970s. This contributes to both flight delays and increased passenger frustration. One of the key elements of turn time in a single-aisle aircraft is passenger boarding. One factor that contributes to an increase in passenger boarding time is an increase in the amount of passenger carry-on luggage. Passengers have increased their carry-on baggage for a number of reasons, including the implementation of checked baggage fees by the airlines. During the boarding process, finding available passenger bin storage space for carry-on baggage becomes increasingly time consuming and frustrating for passengers and flight attendants, and can cause delayed departure.

Furthermore, it is also important that the balance of an aircraft (i.e., the weight distribution) be within certain specifications to ensure safe operations. The distribution of carry-on baggage among the available passenger bin storage space in an aircraft can affect the balance thereof. There is typically a wide variation in the weight of each passenger's carry-on luggage. This variation can affect the aircraft's balance because, even when each passenger luggage storage bin is filled to capacity, the weight of each such bin can vary significantly given that the loading process for each passenger luggage storage bin is essentially random and controlled only by the order of boarding and the proximity of each passenger's seat location. Because an imbalanced aircraft may expend more fuel during flight, airlines have an incentive to ensure that each departing aircraft is as balanced as possible.

Accordingly, there is a need for a system and method that ensures that the proper weight balance of the aircraft is maintained among the various passenger luggage storage bins during the boarding process.

SUMMARY

In a first aspect, a load weight and balance system for passenger luggage storage bins in an aircraft includes at least one first sensor coupled to each of the passenger luggage storage bins in the aircraft for providing a first output signal proportional to an available internal volume of an associated passenger luggage storage bin. At least one second sensor is coupled to each of the passenger luggage storage bins in the aircraft for providing a second output signal proportional a weight of any luggage in the associated passenger luggage storage bin. A display device for each of the passenger luggage storage bins provides a visual indication whether or not the associated passenger luggage storage bin is filled to capacity. A main display provides a visual indication of a storage status of all of the passenger luggage storage bins. A processor is coupled to receive the first output signals from each of the at least one first sensors. The processor calculates, based upon the first output signals from the at least one first sensors, whether or not each of the associated passenger luggage storage bins is filled to capacity. The processor provides an output signal to each of the display devices causing the display device to indicate whether or not the associated passenger luggage storage bin is filled to capacity. The processor is coupled to receive the second output signals from each of the at least one second sensors. The processor calculates, based upon the second output signals from the at least one second sensors, whether or not each of the associated passenger luggage storage bins is within a predetermined weight value. The processor provides a signal to the main display causing the main display to indicate whether or not each of the passenger luggage storage bins is within a predetermined weight value.

In a further embodiment, each of the at least one second sensors may be a load sensor and the output signal from each of the at least one second sensors may be proportional to a weight of items within the associated passenger luggage storage bin. In addition, each of the at least one first sensors may be a range sensor and the output signal from each of the at least one first sensors may be proportional to an amount of empty space available within the associated passenger luggage storage bin. Further, the processor may provide a signal to the main display causing the main display to indicate whether or not whether or not each of the passenger luggage storage bins is filled to capacity. Still further, the processor may calculate a weight distribution of all of the passenger luggage storage bins in the aircraft. The processor may determine whether or not the weight distribution of all of the passenger luggage storage bins in the aircraft is balanced. The processor may determine instructions on how to adjust a contents of at least some of the passenger luggage storage bins in the aircraft to achieve balance when the processor determines that the weight distribution of all of the passenger luggage storage bins in the aircraft is not balanced. Also, the main display is a crew display. The processor may selectively provide signals to the crew display causing the crew display to display the instructions. Alternatively, the main display may be a passenger display.

In a second aspect, a load weight and balance system for passenger luggage storage bins in an aircraft has at least one sensor coupled to each of the passenger luggage storage bins in the aircraft for providing an output signal proportional a weight of any luggage in an associated passenger luggage storage bin. A main display provides a visual indication of a storage status of all of the passenger luggage storage bins. A processor is coupled to receive the output signals from each of the at least one sensors and calculates, based upon the output signals from the at least one sensors, whether or not each of the associated passenger luggage storage bins is within a predetermined weight value and provides a signal to the main display causing the main display to indicate whether or not each of the passenger luggage storage bins is within a predetermined weight value.

In a third aspect, a method for balancing a load weight of passenger luggage storage bins in an aircraft includes determining, for each passenger luggage storage bin, a weight of items within that passenger luggage storage bin. A distribution of passenger luggage storage bin weights across the aircraft is determined. Finally, it is determined whether or not the distribution of passenger luggage storage bin weights across the aircraft is balanced.

In a further embodiment, instructions are provided on adjusting contents of the passenger luggage storage bins to correct any imbalance.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which:

FIGS. 5A and 5b are diagrams of a crew human machine interface showing the operation of the load weight and balance system of the present disclosure.

DETAILED DESCRIPTION

In the present disclosure, like reference numbers refer to like elements throughout the drawings, which illustrate various exemplary embodiments of the present disclosure.

The system disclosed herein helps to speed the passenger boarding process. A clear visual indication of whether there is available space may be provided in each passenger luggage storage bin. In addition, displays (human machine interface) are provided for the crew and for the passengers that indicates the storage status of each passenger luggage storage bin (e.g., empty or filled). The crew display also provides information about the relative weight of each passenger luggage storage bin (e.g., nominal weight or overweight, etc.) and also provides additional balancing instructions to the crew (e.g., instructions on moving some of the contents of one passenger luggage storage bin to another). This allows the crew to quickly identify and correct any weight imbalances in the passenger luggage storage bins during the boarding process and ensures that the aircraft will achieve the proper balance for optimal fuel efficiency during flight.

Figure 1:
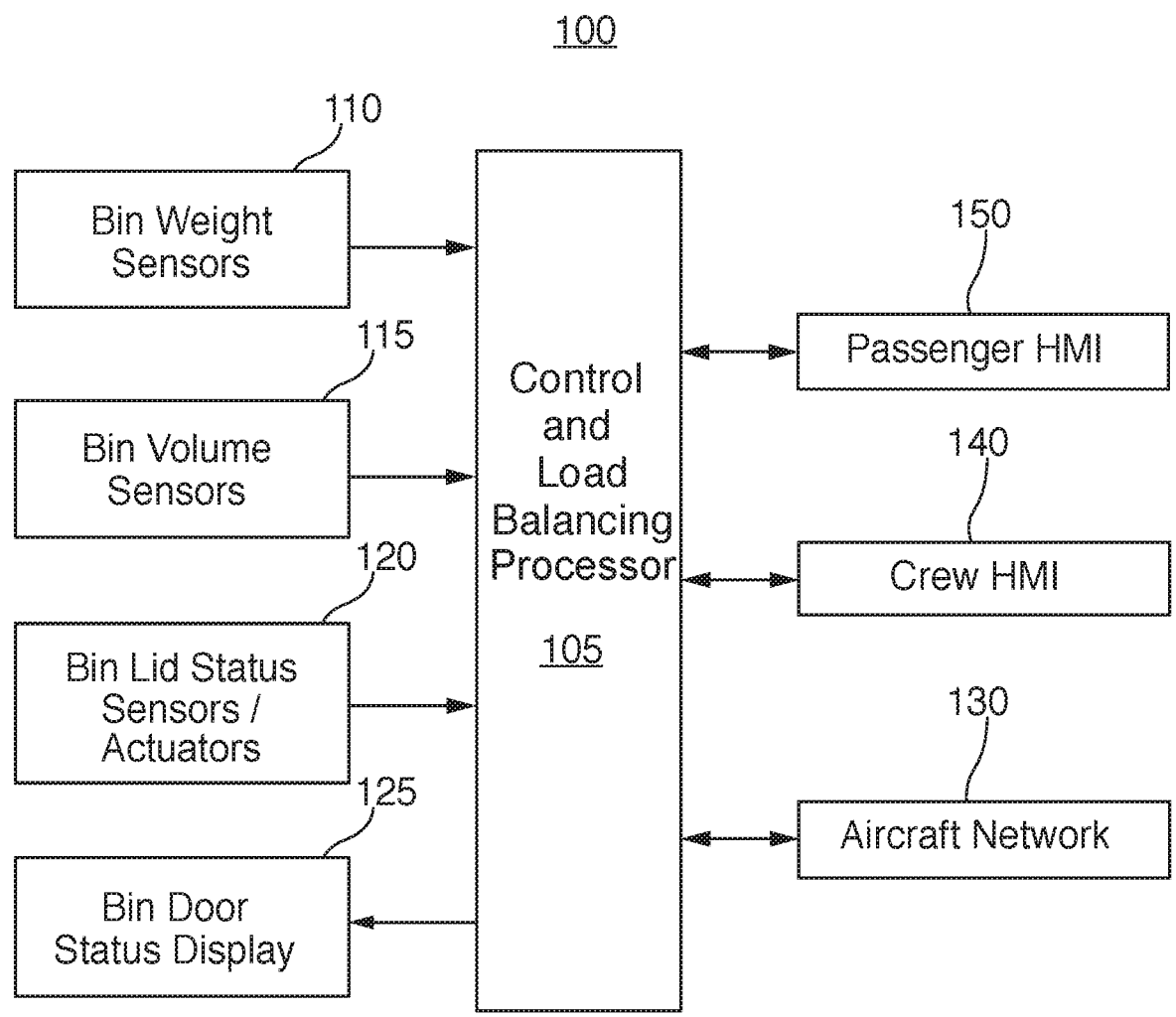
FIG. 1 is block circuit diagram of a passenger luggage storage bin load weight and balance system according to an embodiment of the present disclosure.

Referring now to FIG. 1, a block diagram is shown for a passenger luggage storage bin load sensing system 100. Sensing system 100 includes a control and load balancing processor 105 having a first input coupled to a set of bin weight sensors 110, a second input coupled to a set of bin volume sensors 115, and a third input coupled to a set of bin door status sensors/actuators 120. The bin door status sensors/actuators 120 provide an indication of the state (e.g., open or closed) of the door on each passenger luggage storage bin and may also provide, via the actuator mechanism, the ability to remotely lock and unlock each bin door under the control of processor 105. In addition, processor 105 also has an output coupled to a set of bin door status displays 125. Each bin door status display 125 is preferably mounted on an external portion of a door of the respective passenger luggage storage bin. As one of ordinary skill in the art will readily recognize, each bin door status display 125 may be mounted in other positions adjacent to the associated passenger luggage storage bin and still provide adequate status notice to passengers. Processor 105, bin weight sensors 110, and bin volume sensors 115 are preferably selected to be low power, low voltage units to minimize the loading on the aircraft's internal power system. Each bin door status display 125 is preferably an LED device which provides a clear indication that the associated passenger luggage storage bin is either "filled" or "not filled." For example, each bin door status display 125 may emit a first color (e.g., green) when the associated passenger luggage storage bin is not filled and a second color (e.g., red) when the associated passenger luggage storage bin is filled. In one alternative embodiment, each bin door status display 125 may only become active (lit) when the associated passenger luggage storage bin is filled (or when it is not filled)—e.g., an LED device positioned behind a translucent "FILLED" (or "NOT FILLED") panel. In another alternative embodiment, each bin door status display 125 may be an LED display which provides more detailed description of the storage status of the associated passenger luggage storage bin, e.g., a display which states one of "FILLED" or "NOT FILLED."

Processor 105 is also coupled to the aircraft's data network 130, a passenger human machine interface (display) 150, and a crew human machine interface (display) 140. The passenger display 150 and the crew display 140 are main displays which provide status information about all of passenger luggage storage bins. The passenger display 150 (which may consist of numerous display screens distributed across the aircraft and may be provided as part of a multi-use display, either at each seating location or within various portions of the aircraft) provides the storage status of each passenger luggage storage bin on the aircraft (e.g., empty or filled). The crew display 140 provides storage status information to allow the flight attendants to assist boarding passengers to identify unfilled passenger luggage storage bins and also provides information about the relative weight of each passenger luggage storage bin (e.g., nominal weight or overweight, etc.). Crew display 140 also selectively provides additional balancing instructions to the crew (e.g., instructions on moving some of the contents of one passenger luggage storage bin to another). Aircraft network 130 may be, for example, an aircraft data network compliant with industry standard ARINC-664 network protocol.

As described above, in the present system each passenger luggage storage bin includes one or more bin weight sensors 110 and one or more bin volume sensors 115. Processor 105 receives signals from each of the bin weight sensors 110 and each of the bin volume sensors 115 and, based on such signals, determines, essentially in real-time, the storage status of each passenger luggage storage bin and whether the luggage stored in each passenger luggage storage bin is within a predetermined weight value or weight range. For example, the processor may determine based on the signals from the bin weight sensors 110 if each passenger luggage storage bin is at or near a nominal value or is overweight (excessive). In some exemplary embodiments, the predetermined weight value or weight range may be that of a nominal weight value that is between 200 and 250 pounds, for example. Based on such determinations, processor 105 outputs signals to each of the bin door status displays 125 that indicates current storage status information, i.e., at least whether the particular passenger luggage storage bin is either "FILLED" or "NOT FILLED," as discussed above. Processor 105 also updates current storage status information on each of the passenger displays 150 and on each of the crew displays 140. In the event that any of the passenger luggage storage bins are found to be overweight, processor 105 also updates the weight balancing information shown on crew display 140 and determines load balancing information that is displayed on the crew display 140 upon a crew request (as discussed with respect to FIGS. 5A and 5B).

Figure 2:
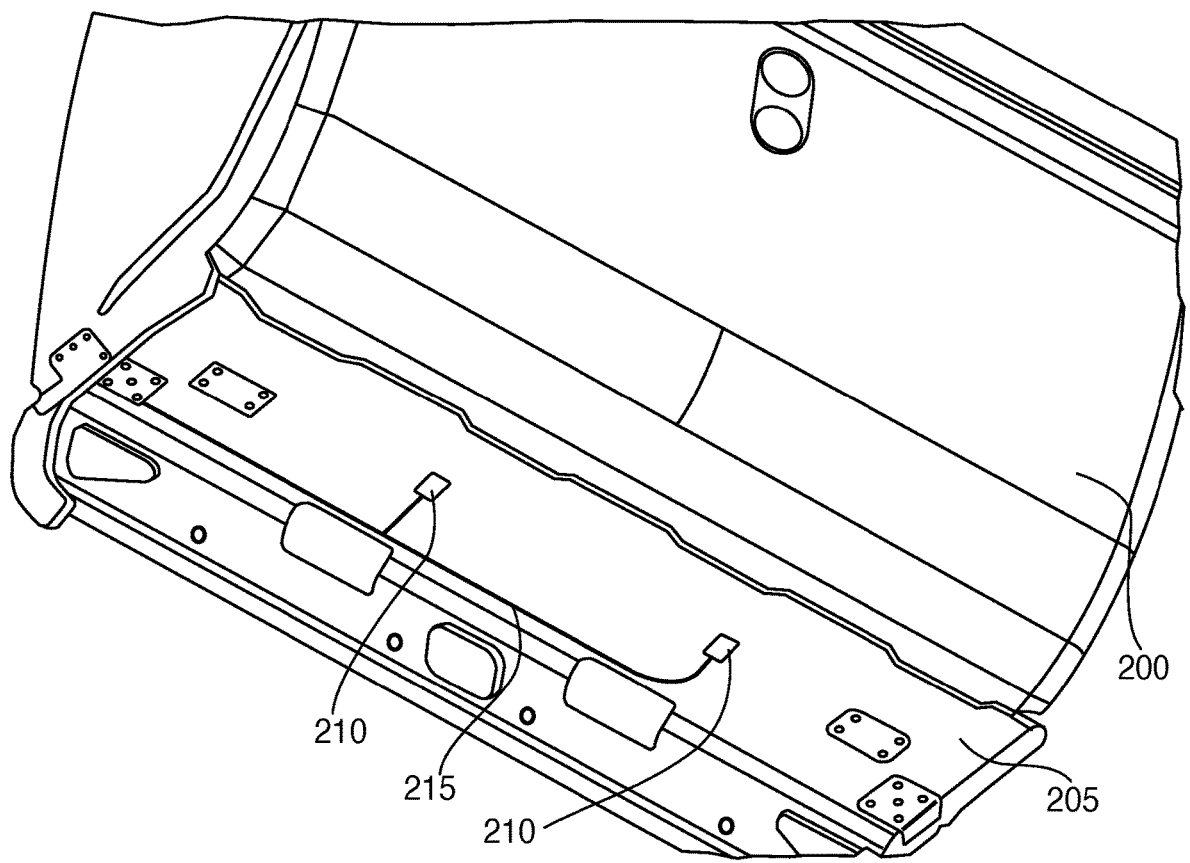
FIG. 2 is a diagram showing bin weight sensors positioned on a bottom surface of a passenger luggage storage bin according to the present disclosure.

Referring now to FIG. 2, each passenger luggage storage bin 200 may include one or more bin weight sensors 210 mounted on a bottom panel 205 of the passenger luggage storage bin 200. Each bin weight sensor 210 may be, for example, a load cell such as a piezoelectric pressure sensor. Each bin weight sensor 210 is coupled to processor 105 (not shown in FIG. 2) via wiring 215. In alternative embodiments, bin weight sensors 210 may be mounted either on support rods or attachment fittings for passenger luggage storage bin 200 (instead of on bottom panel 205). Each of the bin weight sensors 210 provides an output signal which enable processor 105 to determine, in real time, the weight of any luggage currently placed in passenger luggage storage bin 200.

Figure 3:
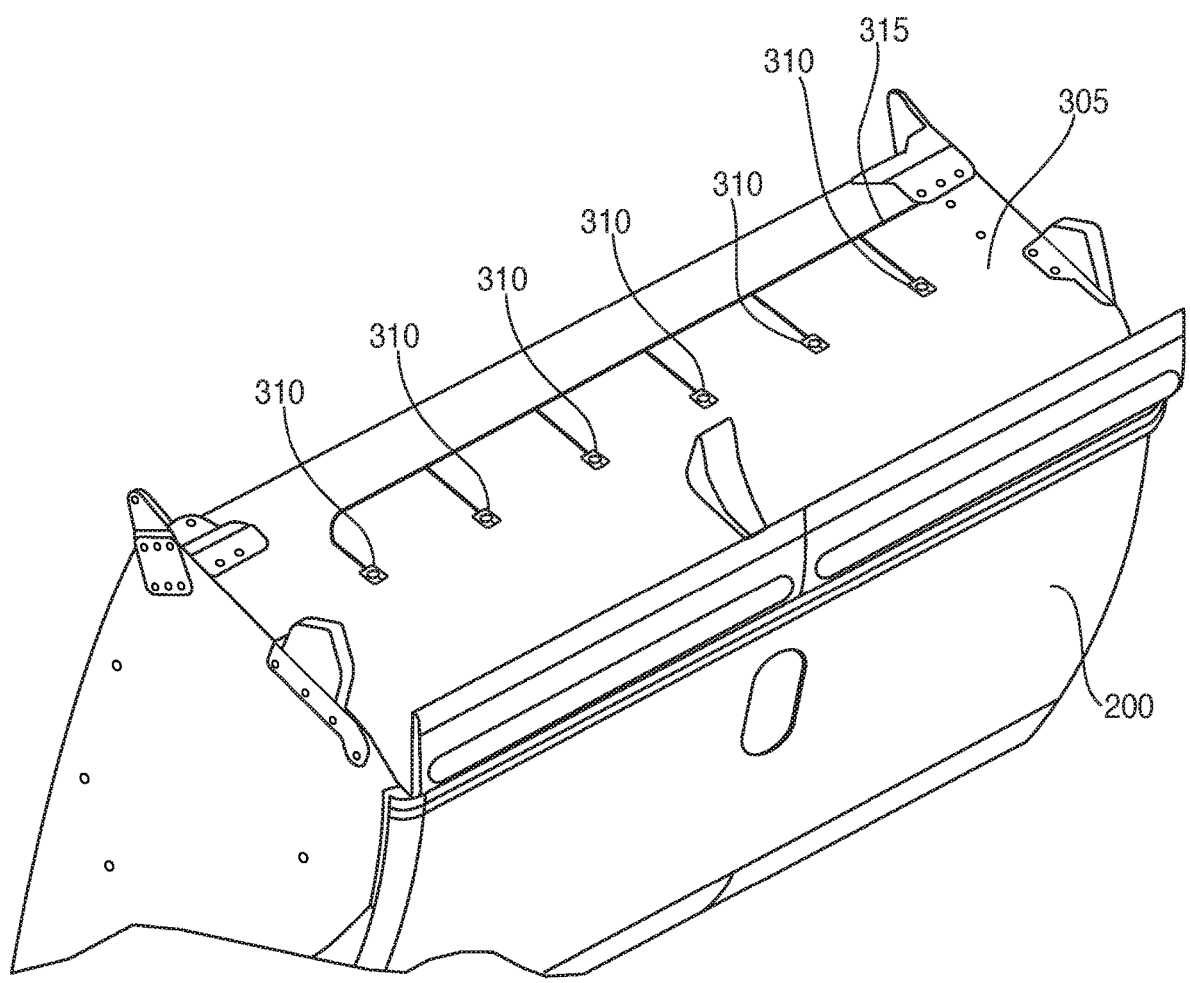
FIG. 3 is a diagram showing bin volume sensors positioned on a top surface of a passenger luggage storage bin according to the present disclosure.

Referring now to FIG. 3, one or more bin volume sensors 310 (e.g., infrared or ultrasonic rangefinder devices, a two-dimensional laser scanner or a three-dimensional vision system) are mounted on a top panel 305 of passenger luggage storage bin 200 that are used in system 100 to determine the available internal volume (i.e., the available space) within each passenger luggage storage bin 200. Each of the bin volume sensors 310 provides a volume signal to processor 105 (not shown in FIG. 3) via wiring 315 to allow processor 105 to determine whether there is any space remaining within each respective passenger luggage storage bin 200. Although six bin volume sensors 310 are shown in FIG. 3, the precise number of such bin volume sensors 310 required depends upon the size of passenger luggage storage bin 200 and the type of such bin volume sensor 310 selected for use in system 100.

Figure 4A:
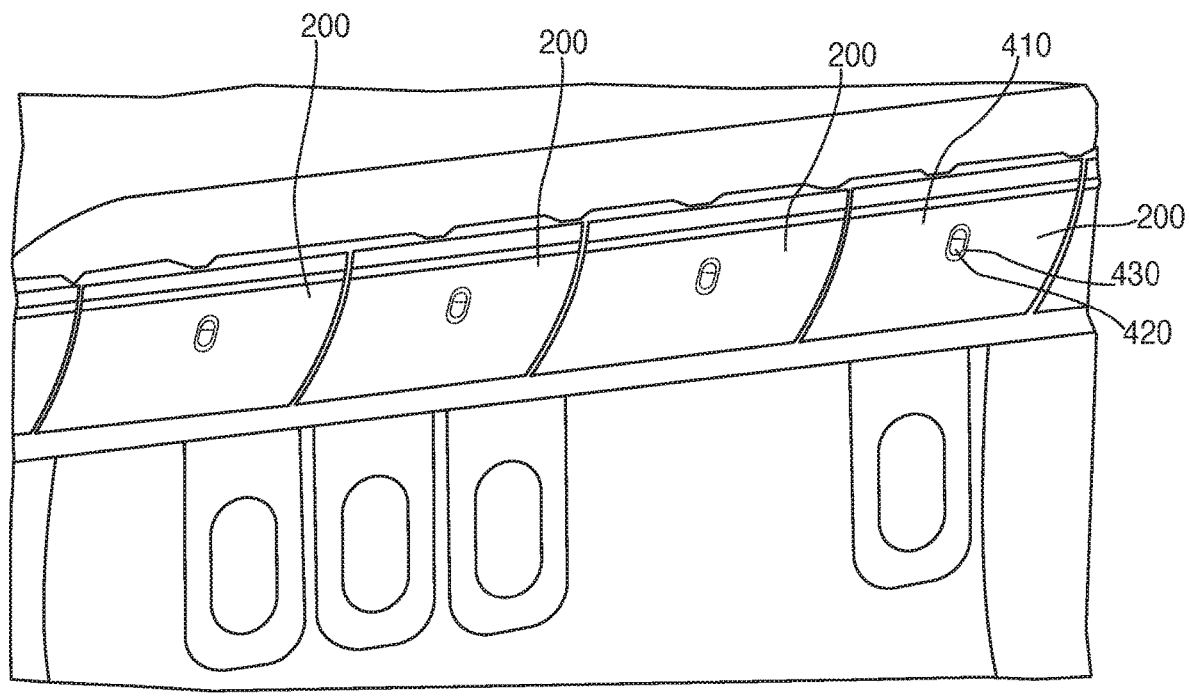
FIG. 4A is a diagram showing visual indicators according to the present disclosure positioned on a front surface of passenger luggage storage bins.
Figure 4B:
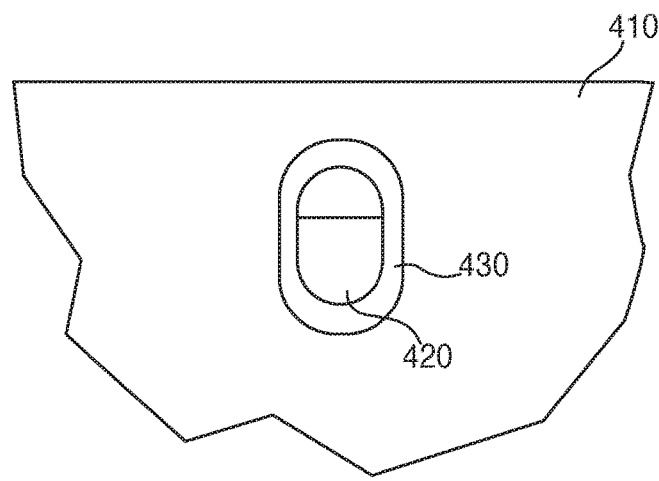
FIG. 4B is a diagram showing a close-up of a single visual indicator from FIG. 4A.

Referring now to FIGS. 4A and 4B, each passenger luggage storage bin 200 has a front panel 410 with a latch mechanism 420. A display device 430 may be provided surrounding latch mechanism 420 which is, in the preferred embodiment, capable of being activated in two different colors, e.g., red and green. In operation, processor 105 determines whether or not the each passenger luggage storage bin 200 has space available for additional luggage, and provides a storage status indication signal by, for example, causing display device 430 to be activated as a red light when passenger luggage storage bin 200 is filled and to be activated as a green light when passenger luggage storage bin 200 is not filled.

Referring now to FIG. 5A, a diagram of the crew human machine interface (display) 500 is shown. Crew display 500 may be provided on a specialized tablet or other portable device (smart phone) for use by the crew or on a display mounted within an area of the aircraft reserved for the crew. Crew display 500 may be provided on a touchscreen device or may have another input device associated therewith (e.g., a keypad or mouse) for entering commands. The crew display 500 provides a visual indication of each passenger luggage storage bin on the aircraft and by shading (or alternatively color) identifies both storage status information (empty shading 510) and load balancing information. The load balancing information may be granular, only identifying whether each passenger luggage storage bin is within a nominal value (nominal shading 520) or is overweight (overweight shading 530) or may be more fine. In FIG. 5A, the load balancing information is fine, also displaying information indicating whether each passenger luggage storage bin is below nominal weight (nominal—light shading 550) or above nominal weight (nominal—heavy shading 540). Finally, information may also be provided indicating whether a particular passenger luggage storage bin is out of service (out of service shading 560). Crew display 500 also includes a link 570 to a second page 580 (shown in FIG. 5B) that provides load balancing information. Link 570 may be activate via the touch-screen or an alternative input device. The passenger display 150 (FIG. 1) provides the same information as the crew display 500, but does not include link 570. The passenger display 150 may be provided via the aircraft's on-board entertainment system. The crew display 140 may also provide a selectable link used to remotely lock and unlock the door of all of the passenger luggage storage bins.

Referring now to FIG. 5B, when processor 105 determines that the luggage weight distribution is imbalanced, instructions 590, 591 are provided via second page 580 on moving some of the luggage stored in one passenger luggage storage bin to another. For example, instructions 590 state "Merge 34K with 33D and move part of 32K to 34K" (34K, 33D, and 32K are identifiers for particular passenger luggage storage bins) and instructions 591 state "Move part of 1K to 3D" (1K and 3D are identifiers for particular passenger luggage storage bins). By providing this second page 580 on display 500, a flight attendant can quickly fulfill these instructions once the passengers are seated to ensure that the weight distribution among the various passenger luggage storage bins is balanced.

Figure 6:
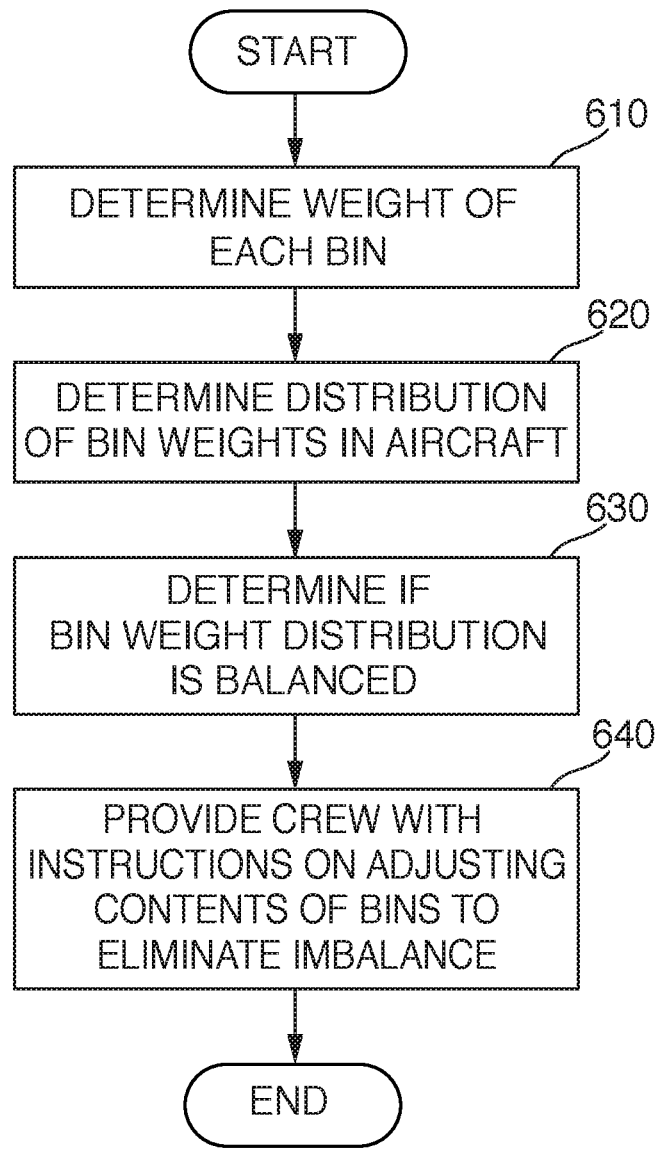
FIG. 6 is a flowchart of a method of balancing the passenger luggage storage bin load weight according to the present disclosure.

Referring now to FIG. 6, a flowchart 600 is shown of a method of balancing the passenger luggage storage bin load weight in an aircraft. First, at step 610, the weight of items within each passenger luggage storage bin is determined. Next, at step 620, the distribution of passenger luggage storage bin weights across the aircraft is determined. Thereafter, at step 630, a determination is made based upon the weight of items within all of the passenger luggage storage bins distribution of passenger luggage storage bin weights across the aircraft. Finally, at step 640, if an imbalance is determined, the crew is provided with instructions on adjusting the contents of the passenger luggage storage bins to correct the imbalance.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A load weight and balance system for passenger luggage storage bins in an aircraft, comprising:
    at least one first sensor coupled to each of the passenger luggage storage bins in the aircraft for providing a first output signal proportional to an available internal volume of an associated passenger luggage storage bin;
    at least one second sensor coupled to each of the passenger luggage storage bins in the aircraft for providing a second output signal proportional a weight of any luggage in the associated passenger luggage storage bin;

a display device for each of the passenger luggage storage bins for providing a visual indication whether or not the associated passenger luggage storage bin is filled to capacity;

a main display for providing a visual indication of a storage status of all of the passenger luggage storage bins; and a processor coupled to receive the first output signals from each of the at least one first sensors and which is configured to:

calculate, based upon the first output signals from the at least one first sensors, whether or not each of the associated passenger luggage storage bins is filled to capacity;

provide an output signal to each of the display devices causing the display device to indicate whether or not the associated passenger luggage storage bin is filled to capacity;

receive the second output signals from each of the at least one second sensors;

calculate, based upon the second output signals from the at least one second sensors, whether or not each of the associated passenger luggage storage bins is within a predetermined weight value;

provide a signal to the main display causing the main display to indicate whether or not each of the passenger luggage storage bins is within the predetermined weight value;

calculate a balance state of the aircraft based on distribution of passenger luggage storage bin weights across the aircraft;

determine a first redistribution of contents of at least some of the passenger luggage storage bins in the aircraft to improve the balance state responsive to the processor determining that the distribution of the passenger luggage storage bin weights is not balanced, and wherein determining the first redistribution includes identifying that moving a first item from a first passenger luggage storage bin to a second passenger luggage storage bin improves the balance state; and display instructions at the main display, wherein the instructions include an instruction to move the first item from the first passenger luggage storage bin to the second passenger luggage storage bin.

2. The load weight and balance system of claim 1, wherein each of the at least one second sensor comprises a load sensor and wherein the output signal from each of the at least one second sensor is proportional to a weight of items within the associated passenger luggage storage bin.

3. The load weight and balance system of claim 1, wherein each of the at least one first sensor comprises a range sensor and wherein the output signal from each of the at least one first sensor is proportional to an amount of empty space available within the associated passenger luggage storage bin.

4. The load weight and balance system of claim 1, wherein the processor is configured to provide a signal to the main display causing the main display to indicate whether or not each of the passenger luggage storage bins is filled to capacity.

5. The load weight and balance system of claim 1, wherein the processor is configured to calculate the distribution of all of the passenger luggage storage bin weights.

6. The load weight and balance system of claim 1, wherein the at least one second sensor comprises a piezoelectric pressure sensor.

7. The load weight and balance system of claim 1, wherein the instructions include a second instruction to move a second item from a third passenger luggage storage bin to a fourth passenger luggage storage bin.

8. The load weight and balance system of claim 1, wherein the main display is a crew display.

9. The load weight and balance system of claim 8, wherein the visual indication of the storage status of all of the passenger luggage storage bins comprises a map identifying each of the passenger luggage storage bins, and wherein each visual representations of the passenger luggage storage bins on the map are shaded based on a corresponding storage status.

10. The load weight and balance system of claim 1, wherein the main display is a passenger display.

11. A load weight and balance system for passenger luggage storage bins in an aircraft, comprising:

at least one sensor coupled to each of the passenger luggage storage bins in the aircraft for providing an output signal proportional a weight of any luggage in an associated passenger luggage storage bin;

a main display for providing a visual indication of a storage status of all of the passenger luggage storage bins; and a processor coupled to receive the output signals from each of the at least one sensors and which is configured to:

calculate, based upon the output signals from the at least one sensors, whether or not each of the associated passenger luggage storage bins is within a predetermined weight value;

provide a signal to the main display to cause the main display to indicate whether or not each of the passenger luggage storage bins is within the predetermined weight value;

calculate a balance state of the aircraft based on distribution of passenger luggage storage bin weights across the aircraft;

determine a first redistribution of contents of at least some of the passenger luggage storage bins in the aircraft to improve the balance state responsive to the processor determining that the distribution of the passenger luggage storage bin weights is not balanced, and wherein determining the first redistribution includes identifying that moving a first item from a first passenger luggage storage bin to a second passenger luggage storage bin improves the balance state; and display instructions at the main display, wherein the instructions include an instruction to move the first item from the first passenger luggage storage bin to the second passenger luggage storage bin.

12. The load weight and balance system of claim 11, wherein each of the at least one sensor is a load cell.

13. The load weight and balance system of claim 11, wherein the processor is configured to calculate the distribution of the passenger luggage storage bin weights across the aircraft.

14. The load weight and balance system of claim 13, wherein the instructions include a second instruction to move a second item from a third passenger luggage storage bin to a fourth passenger luggage storage bin.

15. The load weight and balance system of claim 14, wherein the main display is a crew display.

16. The load weight and balance system of claim 15, wherein the first instruction comprises merging the contents of the first passenger luggage storage bin with the contents of the second passenger luggage storage bin or moving a portion of the contents of the first passenger luggage storage bin to the second passenger luggage storage bins, wherein the first passenger luggage storage bin is in a different column, row, or both as the second passenger luggage storage bin.

17. The load weight and balance system of claim 11, wherein the at least one sensor comprises a piezoelectric pressure sensor.

18. The load weight and balance system of claim 11, wherein the main display is a passenger display.

19. A method for balancing a load weight of passenger luggage storage bins in an aircraft, comprising the steps of:
   determining, for each passenger luggage storage bin of a plurality of passenger luggage storage bins, a weight of items within that passenger luggage storage bin;
   determining a distribution of passenger luggage storage bin weights across the aircraft;
   determining a balance state of the aircraft based on the distribution of passenger luggage storage bin weights across the aircraft;
   determining a first redistribution of contents of at least some of the passenger luggage storage bins in the aircraft to improve the balance state responsive to a determination that the distribution of the passenger luggage storage bin weights is not balanced, and determining the first redistribution includes identifying that moving a first item from a first passenger luggage storage bin to a second passenger luggage storage bin improves the balance state; and
   displaying instructions at a main display, wherein the instructions include an instruction to move the first item from the first passenger luggage storage bin to the second passenger luggage storage bin.

20. The method of claim 19, wherein the instructions include a second instruction to move a second item from a third passenger luggage storage bin to a fourth passenger luggage storage bin.

* * * * *